(12) United States Patent
Martin

(10) Patent No.: US 9,404,425 B2
(45) Date of Patent: Aug. 2, 2016

(54) DEVICE AND A METHOD OF REGULATING A POWER PLANT INCLUDING AT LEAST ONE TURBINE ENGINE, AND AN AIRCRAFT

(71) Applicant: AIRBUS HELICOPTERS, Marignane (FR)

(72) Inventor: Laurent Martin, Chateaurenard (FR)

(73) Assignee: Airbus Helicopters, Marignane (FR)

( * ) Notice: Subject to any disclaimer, the term of this patent is extended or adjusted under 35 U.S.C. 154(b) by 864 days.

(21) Appl. No.: 13/747,533

(22) Filed: Jan. 23, 2013

(65) Prior Publication Data
US 2013/0291549 A1    Nov. 7, 2013

(30) Foreign Application Priority Data
Feb. 6, 2012   (FR) ...................................... 12 00343

(51) Int. Cl.
*F02C 9/00*    (2006.01)
*F02C 9/56*    (2006.01)

(52) U.S. Cl.
CPC ... *F02C 9/00* (2013.01); *F02C 9/56* (2013.01); *F05D 2220/329* (2013.01); *F05D 2270/303* (2013.01); *F05D 2270/304* (2013.01); *F05D 2270/305* (2013.01)

(58) Field of Classification Search
CPC ................ F02C 9/56; F02C 9/00; F02C 9/26; F05D 2270/303; F05D 2270/304; F05D 2270/305; F05D 2220/329
See application file for complete search history.

(56) References Cited

U.S. PATENT DOCUMENTS

| | | | |
|---|---|---|---|
| 4,736,331 A | 4/1988 | Lappos | |
| 5,873,546 A | 2/1999 | Evans | |
| 6,931,856 B2* | 8/2005 | Belokon | F02C 3/113 60/39.12 |
| 7,615,881 B2* | 11/2009 | Halsey | F01D 15/10 290/52 |
| 7,777,358 B2* | 8/2010 | Halsey | F01D 15/10 290/2 |
| 7,884,491 B2* | 2/2011 | Halsey | F01D 15/10 290/52 |
| 8,050,842 B2 | 11/2011 | Iraudo | |

(Continued)

FOREIGN PATENT DOCUMENTS

| | | |
|---|---|---|
| EP | 2006202 A1 | 12/2008 |
| FR | 2902407 A1 | 12/2007 |

(Continued)

OTHER PUBLICATIONS

Search Report and Written Opinion; Application No. FR 1200343; dated Sep. 24, 2012.

*Primary Examiner* — Carlos A Rivera
(74) *Attorney, Agent, or Firm* — Brooks Kushman P.C.

(57) ABSTRACT

A regulator device (10) for regulating a turbine engine (3). The regulator device (10) includes mechanical power take-off means (100) for taking off power mechanically from a gas generator (4), and an engine computer (20) controlling said engine (3) to comply with at least a first limitation (LimTET, LimT45) of a temperature (TET, T45) of the gas within the engine, and with a second limitation (LimNg) of a speed of rotation (Ng) of the gas generator (4). The engine computer (20) determines whether the speed of rotation (Ng) of the gas generator has reached said second limitation (LimNg), and whether said temperature (TET, T45) has reached said first limitation (LimTET, LimT45). An avionics computer (30) causes the mechanical power take-off means (100) to operate if the speed of rotation (Ng) of the gas generator (4) has reached said second limitation (LimNg), and if said temperature (TET, T45) has not reached said first limitation (LimTET, LimT45).

14 Claims, 1 Drawing Sheet

(56) References Cited

U.S. PATENT DOCUMENTS

| | | |
|---|---|---|
| 8,121,773 B2 | 2/2012 | Gaulmin |
| 8,201,414 B2 | 6/2012 | Haehner |
| 2004/0119293 A1 | 6/2004 | McKelvey |
| 2006/0225431 A1* | 10/2006 | Kupratis ............... F01D 15/10 60/791 |
| 2008/0148726 A1* | 6/2008 | Halsey ................. F01D 15/10 60/538 |
| 2008/0319629 A1* | 12/2008 | Iraudo .................. B64D 43/00 701/100 |
| 2010/0058731 A1 | 3/2010 | Haehner |

FOREIGN PATENT DOCUMENTS

| | | |
|---|---|---|
| FR | 2914697 A1 | 10/2008 |
| FR | 2968716 A1 | 6/2012 |

\* cited by examiner

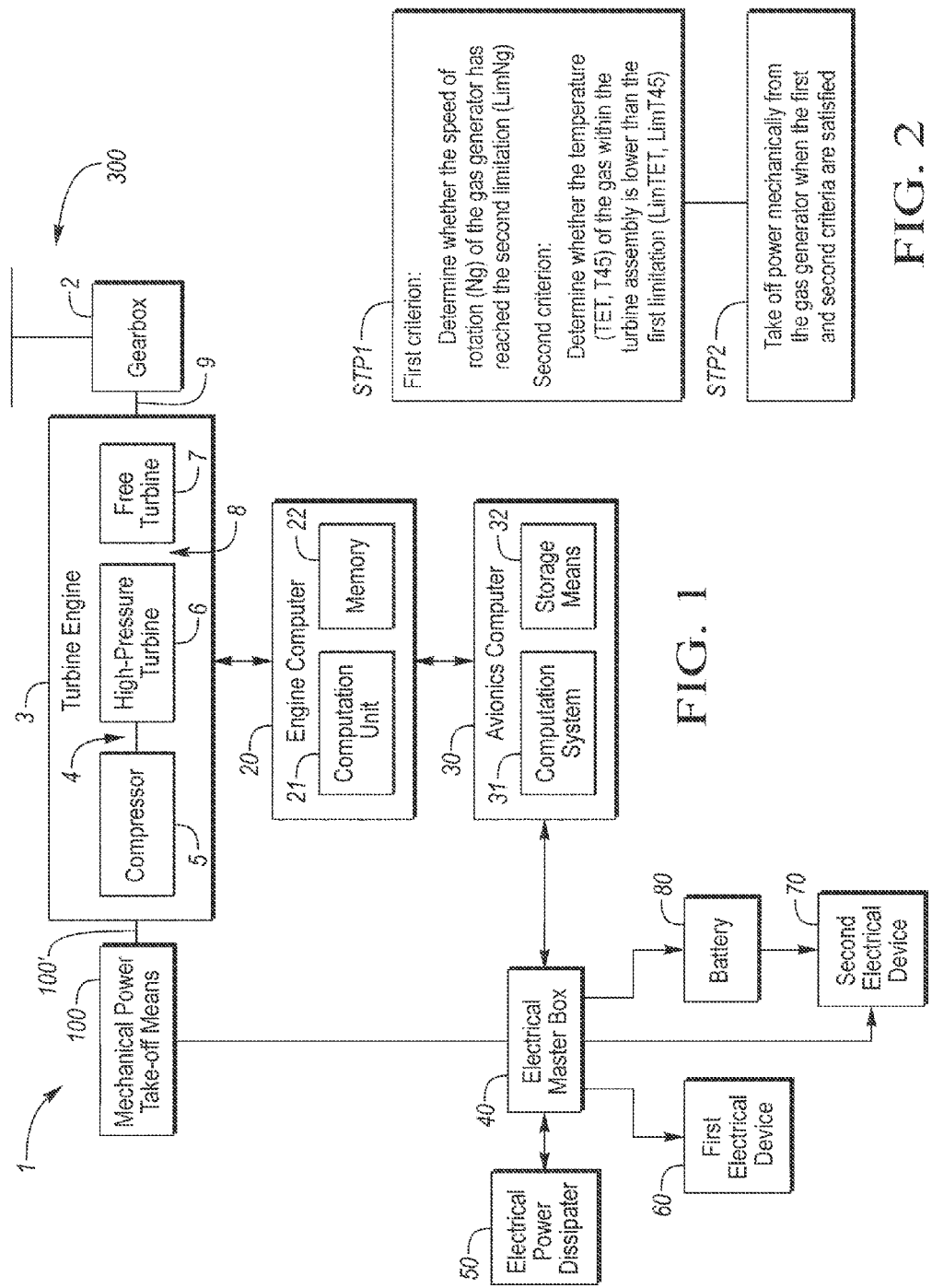

DEVICE AND A METHOD OF REGULATING A POWER PLANT INCLUDING AT LEAST ONE TURBINE ENGINE, AND AN AIRCRAFT

CROSS REFERENCE TO RELATED APPLICATIONS

This application claims priority to French patent application No. FR 12 00343 filed on Feb. 6, 2012, the disclosure of which is incorporated in its entirety by reference herein.

BACKGROUND OF THE INVENTION (1) Field of the Invention

The present invention relates to a device and a method of regulating a power plant including at least one turbine engine, and to an aircraft such as a rotorcraft.

(2) Description of Related Art

A rotorcraft conventionally includes a main lift or indeed propulsion rotor in the context of a helicopter. The main rotor is driven by a system referred to below as a "power plant", for convenience.

A power plant includes at least one engine provided with a gas generator and with a free turbine for driving the main rotor in rotation. Such a gas generator is provided with a compressor connected to a high-pressure turbine, the high-pressure turbine being arranged upstream from the free turbine.

The driving power is then taken from a low-pressure stage of each free turbine, which stage is mechanically independent of the compressor assembly and of the high-pressure stage of the turbine engine. Each free turbine of a turbine engine operates at a speed of rotation lying in the range 20,000 revolutions per minute (rpm) to 50,000 rpm, so a speed-reduction gearbox is needed in the connection with the main rotor since its speed of rotation lies substantially in the range 200 rpm to 400 rpm: this is referred to as the main power transmission gearbox.

In order to control the operation of an engine, the aircraft includes an engine computer, known in particular under the acronym FADEC for "full authority digital engine control".

In addition, the aircraft also includes air extraction means that are capable of extracting air from the gas generator of an engine. Such air extraction means may include a valve for adjusting the rate of extraction.

Furthermore, the aircraft includes mechanical power take-off means for taking off power mechanically from the gas generator.

The mechanical power take-off means may comprise electrical equipment that is connected to the gas generator of at least one engine. Such electrical equipment thus performs the function of an electricity generator by taking off power mechanically from the gas generator.

The electrical equipment may also perform a starter function by driving the gas generator during a starting stage.

The electrical equipment is thus sometimes referred to as a "starter-generator".

In another aspect, thermal limitations on the engine and torque limitations on the main power transmission gearbox serve to define three normal utilization ratings for the engine.

Among known ratings, mention may be made of the following:

the take-off rating which associates a maximum take-off power PMD with a duration of utilization of about 5 minutes (min) to 10 min;

the maximum continuous rating associating a maximum continuous power PMC with an unlimited utilization duration; and the transient rating associating a maximum transient power PMT with a limited utilization duration.

There also exist super-contingency ratings for aircraft having at least two engines, these ratings being for use when one of the engines fails:

a first contingency rating associates a super-contingency power with a duration of about thirty consecutive seconds known as 30 sec OEI (for one engine inoperative), this first contingency rating being usable on about three occasions during a flight;

a second contingency rating associating a maximum contingency power with a utilization duration of about two minutes, known as 2 min OEI; and a third contingency rating associating an intermediate contingency power with a utilization duration extending to the end of a flight after one engine has failed, for example, known as continuous OEI.

Each power rating of an engine is thus monitored in use by means of monitoring parameters.

Since the engine is provided with a turbine assembly comprising a high-pressure turbine and a low-pressure turbine, a monitoring parameter may be a temperature of the gas flowing through the assembly.

In particular, since a high-pressure turbine is arranged upstream from a free turbine, a first monitoring parameter may be the temperature of the gas at the inlet to the high-pressure turbine, known as TET by the person skilled in the art.

The blades of the high-pressure turbine of the engine are subjected to centrifugal force and to the temperature TET. Above a certain level, the material constituting the blades is subjected to creep, thereby causing expansion that lengthens the blades. Thus, the blades run the risk of touching the casing of the high-pressure turbine and of thus being degraded. The temperature TET is thus associated directly with degradation of the engine.

Nevertheless, since the temperature TET is difficult to measure because of its relatively non-uniform nature, the first monitoring parameter may be the temperature of the gas at the entry to the free turbine, known to the person skilled in the art as T45. The temperature T45 is a good indicator of the temperature TET, and consequently it is representative of the degradation of the engine.

A first monitoring parameter is thus the temperature of an assembly having at least one turbine, this temperature possibly being the temperature TET of the gas at the inlet to the high-pressure turbine or the temperature T45 of the gas at the inlet to the free turbine.

In addition, a second monitoring parameter relates to the speed of rotation of the gas generator of the engine, known as Ng by the person skilled in the art.

A third monitoring parameter may be the torque Tq exerted by an outlet shaft of the engine driving a main power transmission gearbox.

The torque is monitored in particular to guarantee the physical integrity of the transmission shaft or of the main power transmission gearbox.

Under such circumstances, each power rating of an engine is associated with a first limitation of the first monitoring parameter and with a second limitation of the second monitoring parameter so as to preserve the health of the engine. Furthermore, each power rating is associated with a third limitation of the third monitoring parameter so as to comply the torque that is acceptable for the mechanical systems driven by the free turbine of the engine.

When a particular power rating of an engine is engaged, the power developed by the engine is thus limited by at least one of said limitations. The acceleration capacity of an engine is also limited by the fuel flow rate that can be supplied to the engine.

In addition, on an aircraft including at least two engines, when the third contingency rating is activated following the failure of one engine, it is still possible to extract air and to take off power mechanically from each engine in operation.

However, when the first contingency rating or the second contingency rating is activated, off-loading is necessary. Air extraction is conventionally stopped on the engines in operation.

Documents FR 2 914 697 and US 2010/0058731 relate to a turbine engine having a gas generator and a free turbine that is rotated by the stream of gas generated by the gas generator. The turbine engine further includes an auxiliary motor coupled to a shaft of the gas generator in order to supply an additional quantity of rotary kinetic energy to the shaft.

Furthermore, those documents envisage taking off a quantity of rotary kinetic energy from the shaft of the gas generator during a deceleration stage of the engine so as to assist the deceleration.

The technological background includes the following documents: EP 2 006 202; US 2004/119293; U.S. Pat. No. 4,736,331; U.S. Pat. No. 5,873,546; FR 2 902 407; and FR 2 968 716.

BRIEF SUMMARY OF THE INVENTION

An object of the present invention is thus to propose a method of regulating a power plant including at least one turbine engine to optimize the power developed by the power plant, and not to accelerate the engine.

In the invention, a method is implemented of regulating a power plant including at least one turbine engine, said engine being provided with a gas generator and a turbine assembly. Furthermore, the power plant includes mechanical power take-off means for taking off power from the gas generator of the engine, and an engine computer controlling the engine so as to comply with at least a first limitation for a temperature of the gas within the turbine assembly, and with a second limitation for a speed of rotation Ng of the gas generator.

The first limitation may be a limitation of a temperature TET of the gas at the inlet to a high-pressure turbine or the temperature T45 of the gas at the inlet to the free turbine.

In this method, during an evaluation step, it is determined whether the speed of rotation Ng of the gas generator has reached the second limitation.

Furthermore, during this evaluation step, it is determined whether the temperature of the evaluated gas has reached the first limitation.

Then, during an optimization step, if the speed of rotation of the gas generator has reached the second limitation, and if said temperature has not reached the first limitation, the mechanical power take-off means are controlled to increase the amount of power taken off mechanically so as to optimize the power developed by the engine.

One monitoring parameter of the engine may have reached its limit at the power rating under consideration, while the other monitoring parameters still present a margin relative to their limits at the power rating under consideration.

Under such circumstances, if the speed of rotation Ng of the gas generator has reached the second limitation corresponding to the current power rating of the engine, it is nevertheless determined whether the engine presents a temperature margin.

If so, power is taken off mechanically from the gas generator by using the mechanical power take-off means.

This results in the creation of opposing torque on the gas generator. The speed of rotation Ng of the gas generator thus decreases.

In order to counter the opposing torque, the engine computer naturally increases the flow rate of fuel powering the engine by applying a usual regulation relationship.

The speed of rotation of the free turbine remains constant and the power developed by the engine from the free turbine increases.

Consequently, the method thus makes it possible to increase the power developed by an engine when the speed of rotation Ng of the generator has reached its limit.

Contrary to the teachings of document FR 2 914 697, the method does not seek to accelerate the free turbine in an acceleration stage, but to increase the torque at the outlet from the free turbine without increasing its speed of rotation and by braking the gas generator. To this end, use is made of the mechanical power take-off means that are engaged mechanically with the gas generator.

Possibly, it can be seen that it is possible to power electrical equipment, and not a battery, installed on board the aircraft, so as to increase the fuel flow rate of the engine without causing the speed of rotation of the free turbine to drop.

In other words, if the gas generator reaches its limit, the mechanical power take-off means are used to reduce the speed of rotation of the gas generator and thus increase the outlet torque.

The method may also include one or more of the following additional characteristics.

For example, in an implementation:

during the evaluation step, it is determined whether the mechanical power take-off means have reached a maximum level of mechanical power take-off; and during the optimization step, if the speed of rotation of the gas generator has reached said second limitation, if the temperature has not reached the corresponding first limitation, and if the mechanical power take-off means have not reached a maximum level of mechanical power take-off, the mechanical power take-off means are controlled to increase the amount of power taken off mechanically so as to optimize the power developed by said engine.

In this implementation, it is verified that the mechanical power take-off means are capable of creating opposing torque before calling on them to increase the power developed by the engine.

Such mechanical power take-off means may thus be an electricity generator, or even an electricity generator that also performs a starter function.

In addition, the mechanical power take-off means may electrically power at least one electrical device, and the electricity consumption of said at least one electrical device is maximized to increase the amount of power taken off mechanically from the engine. Electricity consumption may be maximized by adding electricity-consuming devices.

For example, the aircraft may include electrical devices that are temporarily not in operation, such as lights or an air-conditioning device, for example.

The electrical devices may thus be activated to maximize the amount of power taken off mechanically.

Furthermore, an electrical dissipater is provided that is electrically powered by the mechanical power take-off means, the electrical dissipater drawing electrical power if the speed of rotation Ng of the gas generator has reached the corresponding second limitation, and if the monitored temperature has not reached the corresponding first limitation.

The electrical dissipater may be a member that is dedicated solely to this function.

In addition to a method, the invention also provides a regulator device for regulating a power plant including at least one turbine engine, the engine including a gas generator and a turbine assembly. The regulator device includes mechanical power take-off means for taking off power from the gas generator of the engine. The regulator device includes an engine computer controlling the engine so as to comply with at least a first limitation of a monitored temperature of the gas within said assembly, and with a second limitation of a speed of rotation Ng of the gas generator.

Under such circumstances, the engine computer comprises a computation unit and a memory that stores instructions, the computation unit executing said instructions to determine whether the speed of rotation Ng of the gas generator has reached the second limitation, and whether the monitored temperature has reached the first limitation.

Furthermore, the regulator device includes an avionics computer that communicates with the engine computer and with the mechanical power take-off means. The avionics computer includes a computation system that executes stored instructions to control the mechanical power take-off means so as to increase the amount of power taken off mechanically from the engine if the speed of rotation Ng of the gas generator has reached the second limitation, and if the monitored temperature has not reached the first limitation.

The device may include one or more of the following additional characteristics.

For example, the mechanical power take-off means comprise electrical equipment that electrically powers at least one electrical device by means of an electrical master box.

Such mechanical power take-off means may be an electricity generator, possibly also performing a starter function.

Furthermore, the avionics computer may communicate with the mechanical power take-off means by means of the electrical master box to determine whether the mechanical power take-off means have reached a maximum level of mechanical power take-off. If not, the mechanical power take-off means may be used to increase the power developed by the engine.

In addition, the regulator device may include an electrical dissipater that is electrically powered by the mechanical power take-off means, the electrical dissipater drawing electrical power if the speed of rotation Ng of the gas generator has reached the second limitation, and if the monitored temperature has not reached the first limitation.

In another aspect, the invention provides an aircraft provided with a power plant including at least one turbine engine, the engine including a gas generator and a turbine assembly.

The aircraft is thus provided with a regulator device of the above-described type.

BRIEF DESCRIPTION OF THE SEVERAL VIEWS OF THE DRAWINGS

The invention and its advantages appear in greater detail from the following description of embodiments given by way of illustration and with reference to the accompanying figures, in which:

FIG. 1 is a view of an aircraft of the invention; and

FIG. 2 is a diagram explaining the method of the invention.

DETAILED DESCRIPTION OF THE INVENTION

Elements that are present in more than one of the figures are given the same references in each of them.

FIG. 1 shows an aircraft 1 having a rotary wing 300.

The aircraft 1 includes at least one turbine engine 3 for driving the rotary wing 300 by means of a main power transmission gearbox 2.

Each engine includes a gas generator 4 and a free turbine 7. For example, the gas generator includes a compressor 5 that co-operates with a high-pressure turbine 6, the high-pressure turbine 6 being arranged upstream from the free turbine 7. The high-pressure turbine 6 and the free turbine 7 together form a turbine assembly 8.

The free turbine 7 is thus connected to the main power transmission gearbox 2 by a drive train 9. By way of example, the drive train 9 is provided with an outlet shaft that is driven in rotation by the free turbine.

In addition, the aircraft 1 includes a regulator device 10 for maximizing the power that can be developed by the engine.

Such a regulator device is even more advantageous in the context of a multi-engined aircraft for optimizing the power of the engines remaining in operation following the failure of one of the engines.

The regulator device 10 is provided with an engine computer 20, such as an engine computer of the FADEC type.

The engine computer 20 thus comprises a computation unit 21 and a memory 22 that stores instructions that can be executed by the computation unit 21.

Usually, the engine computer controls the position of a fuel metering unit so as to control the operation of the engine 3.

As a function of the power rating of the engine selected by the pilot, the engine computer limits the fuel flow rate so that no monitoring parameter of the engine exceeds the limit associated with said power rating.

In particular, the engine computer 20 controls the engine so that a monitored temperature does not exceed a first limitation.

Depending on the variant, the engine computer compares the temperature TET of the gas at the inlet to a high-pressure turbine or the temperature T45 of the gas at the inlet to the free turbine to a first limitation LimTET, LimT45.

Furthermore, the engine computer 20 controls the engine so that the speed of rotation Ng of the gas generator 4 does not exceed a second limitation LimNg.

With reference to FIG. 2 and in the method being implemented, during an evaluation step STP1, it is determined whether two criteria are satisfied.

Thus, the engine computer 20 measures the speed of rotation Ng of the gas generator 4 and determines if the speed of rotation Ng has reached the second limitation LimNg corresponding to the power rating being applied.

If so, a first criterion is satisfied.

Furthermore, the engine computer 20 measures a temperature of the gas within the turbine assembly 8, namely the temperature TET of the gas at the inlet to the high-pressure turbine 6 or the temperature T45 of the gas at the inlet to the free turbine 7. The engine computer 20 determines whether the monitored temperature is lower than the corresponding first limitation LimTET, LimT45.

If so, a second criterion is satisfied.

With reference to FIG. 2, during an optimization step STP2, power is taken off from the gas generator 4 if the first and second criteria are satisfied.

This results in a reduction in the speed of rotation Ng of the gas generator. The engine computer 20 thus increases the fuel flow rate that is supplied to the engine so as to compensate for this reduction in speed. Consequently, the power developed by the engine is thus optimized.

With reference to FIG. 1, the regulator device 10 includes, for this purpose, mechanical power take-off means 100.

The mechanical power take-off means 100 may be electrical equipment of the electricity-generator type. The mechanical power take-off means 100 are thus driven in rotation by the gas generator 4 via a shaft 100'.

The mechanical power take-off means 100 may also function in motor mode so as to perform a starter function.

Furthermore, the regulator device is provided with an avionics computer 30 provided with a computation system 31 and with storage means 32 that store instructions.

The avionics computer 30 thus communicates with the engine computer 20 to determine whether the two above-mentioned criteria are satisfied.

If so, the avionics computer 30 communicates with the mechanical power take-off means 100 so as to request an increase in the amount of power being taken off mechanically.

It should be observed that prior to the request to take off power, the avionics computer may determine whether it is possible to increase the amount of power being taken off mechanically.

For example, the avionics computer 30 is connected to an electrical master box 40. The electrical master box may be connected to the mechanical power take-off means 100, and also to a plurality of electrical devices 50, 60, 70.

Such electrical devices may include a power dissipater 50 used solely to enable the amount of power that is being taken off mechanically to be increased.

Furthermore, the electrical devices may include first equipment 60 that is powered directly by the electrical master box 40, and second equipment 70 that is electrically powered directly by the electrical master box 40 or by means of a battery 80.

The avionics computer 30 thus communicates with said electrical master box 40 to determine whether it is possible to maximize the electricity consumption of said electrical devices 50, 60, 70.

In particular, the electrical master box may verify whether certain pieces of electrical equipment 50, 60, 70 are in service. If not, it is possible to activate them to increase the electricity consumption of the aircraft.

For example, the avionics computer 30 requests the electrical master box to list the electrical devices that are in operation. Such a list may indicate that lights are not in operation.

If the two above-mentioned criteria are satisfied, the avionics computer 30 then instructs the electrical master box 40 to switch on the lights. In order to power the lights, the electrical master box then requires extra power to be taken off mechanically from the gas generator 4 by the mechanical power take-off means.

Naturally, the present invention may be subjected to numerous variations as to its implementation. Although several embodiments are described above, it should readily be understood that it is not conceivable to identify exhaustively all possible embodiments. It is naturally possible to envisage replacing any of the means described by equivalent means without going beyond the ambit of the present invention.

What is claimed is:

1. A method of regulating an aircraft power plant including at least one turbine engine, the turbine engine including a gas generator, an auxiliary shaft, and a turbine assembly, the turbine assembly including a free turbine and a high-pressure turbine arranged upstream from the free turbine, the gas generator including a compressor connected to the high-pressure turbine, the power plant further including mechanical power take-off means connected to the gas generator via the auxiliary shaft for taking off power mechanically from the gas generator and the power plant further including an engine computer, the method comprising:

the engine computer controlling the turbine engine so as to comply with at least a first limitation (LimTET, LimT45) for a temperature (TET, T45) of the gas within the turbine assembly, and with a second limitation (LimNg) for a speed of rotation (Ng) of the gas generator;

during an evaluation step (STP1), determining whether the speed of rotation (Ng) of the gas generator has reached the second limitation (LimNg);

during the evaluation step (STP1), determining whether the temperature (TET, T45) of the gas within the turbine assembly has reached the first limitation (LimTET, LimT45); and during an optimization step (STP2), if the speed of rotation (Ng) of the gas generator has reached the second limitation (LimNg) and if the temperature (TET, T45) of the gas within the turbine assembly has not reached the first limitation (LimTET, LimT45), then the engine computer controlling the mechanical power take-off means to increase the amount of power taken off mechanically from the gas generator and thereby reduce the speed of rotation (Ng) of the gas generator so as to optimize a power developed by the turbine engine.

2. The method according to claim 1, further comprising:

during the evaluation step (STP1), determining whether the mechanical power take-off means have reached a maximum level of mechanical power take-off; and during the optimization step (STP2), if the speed of rotation (Ng) of the gas generator has reached the second limitation (LimNg), if the temperature (TET, T45) of the gas within the turbine assembly has not reached the first limitation (LimTET, LimT45), and if the mechanical power take-off means have not reached a maximum level of mechanical power take-off, then the engine computer controlling the mechanical power take-off means to increase the amount of power taken off mechanically from the gas generator so as to optimize the power developed by the turbine engine.

3. The method according to claim 1, wherein the mechanical power take-off means electrically power at least one electrical device, and the electricity consumption of the at least one electrical device is maximized to increase the amount of power taken off mechanically from the gas generator.

4. The method according to claim 1, wherein an electrical dissipater is provided that is electrically powered by the mechanical power take-off means, the electrical dissipater drawing electrical power if the speed of rotation (Ng) of the gas generator has reached the second limitation (LimNg) and if the temperature (TET, T45) has not reached the first limitation (LimTET, LimT45).

5. A regulator device for regulating an aircraft power plant including at least one turbine engine, the turbine engine including a gas generator, an auxiliary shaft, and a turbine assembly, the turbine assembly including a free turbine and a high-pressure turbine arranged upstream from the free turbine, the gas generator including a compressor connected to the high-pressure turbine, the regulator device comprising:

mechanical power take-off means connected to the gas generator via the auxiliary shaft for taking off power mechanically from the gas generator;

an engine computer controlling the turbine engine so as to comply with at least a first limitation (LimTET, LimT45) of a temperature (TET, T45) of the gas within the turbine assembly, and with a second limitation (LimNg) of a speed of rotation (Ng) of the gas generator; wherein:

the engine computer comprises a computation unit and a memory that stores instructions, the computation unit executing the instructions to determine whether the speed of rotation (Ng) of the gas generator has reached the second limitation (LimNg), and whether the temperature (TET, T45) of the gas within the turbine assembly has reached the first limitation (LimTET, LimT45); and the regulator device further includes an avionics computer that communicates with the engine computer and with the mechanical power take-off means, the avionics computer including a computation system that executes stored instructions to control the mechanical power take-off means so as to increase the amount of power taken off mechanically from the gas generator and thereby reduce the speed of rotation (Ng) of the gas generator if the speed of rotation (Ng) of the gas generator has reached the second limitation (LimNg) and if the temperature (TET, T45) of the gas within the turbine assembly has not reached the first limitation (LimTET, LimT45).

6. The regulator device according to claim 5, wherein the mechanical power take-off means comprise electrical equipment that electrically powers at least one electrical device by an electrical master box.

7. The regulator device according to claim 6, wherein the avionics computer communicates with the mechanical power take-off means via the electrical master box to determine whether the mechanical power take-off means have reached a maximum level of mechanical power take-off.

8. The regulator device according to claim 5, further comprising an electrical dissipater that is electrically powered by the mechanical power take-off means, the electrical dissipater drawing electrical power if the speed of rotation (Ng) of the gas generator has reached the second limitation (LimNg) and if the temperature (TET, T45) has not reached the first limitation (LimTET, LimT45).

9. The method of claim 1 wherein the first limitation is a limitation (LimTET) for a temperature (TET) of the gas at an inlet to the high-pressure turbine.

10. The method of claim 1 wherein the first limitation is a limitation (LimT45) for a temperature (T45) of the gas at an inlet to the free turbine.

11. The method of claim 1 wherein the mechanical power take-off means include an electrical generator, the electrical generator being driveable in rotation by the gas generator via the auxiliary shaft to take off power mechanically from the gas generator.

12. A method of regulating an aircraft power plant including an engine, a main power transmission gearbox connected to a rotary wing, and an electrical generator, the engine including a gas generator, an auxiliary shaft, and a turbine assembly, the turbine assembly including a free turbine connected to the main power transmission gearbox via an outlet shaft to drive the rotary wing via the main power transmission gearbox, the turbine assembly further including a high-pressure turbine arranged upstream from the free turbine, the gas generator including a compressor connected to the high-pressure turbine, the electrical generator being driveable in rotation by the gas generator via the auxiliary shaft connecting the electrical generator and the gas generator to take off power mechanically from the gas generator when driven in rotation by the gas generator, the method comprising:

an engine computer controlling the engine so as to comply with a first limitation for a temperature of the gas within the turbine assembly and a second limitation for a speed of rotation of the gas generator; and when the speed of rotation of the gas generator has reached the second limitation and the temperature of the gas within the turbine assembly has not reached the first limitation, the engine computer controlling the electrical generator to be driven in rotation by the gas generator to increase the amount of power taken off mechanically from the gas generator and thereby reduce the speed of rotation of the gas generator and the engine computer increasing a fuel flow rate supplied to the engine to increase a torque from the free turbine on the outlet shaft so as to compensate for the reduction in the speed of rotation of the gas generator and thereby optimize a power developed by the engine.

13. The method of claim 12 wherein the first limitation is a limitation for a temperature of the gas at an inlet to the high-pressure turbine.

14. The method of claim 12 wherein the first limitation is a limitation for a temperature of the gas at an inlet to the free turbine.

* * * * *